(12) United States Patent
Homma

(10) Patent No.: US 9,313,356 B2
(45) Date of Patent: Apr. 12, 2016

(54) NETWORK SYSTEM AND IMAGE PROCESSING APPARATUS FOR COORDINATED PROCESSING, CONTROL METHOD THEREOF, AND STORAGE MEDIUM

(71) Applicant: CANON KABUSHIKI KAISHA, Tokyo (JP)

(72) Inventor: Takayuki Homma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 13/728,179

(22) Filed: Dec. 27, 2012

(65) Prior Publication Data

US 2013/0188203 A1 Jul. 25, 2013

(30) Foreign Application Priority Data

Jan. 25, 2012 (JP) ................... 2012-013428

(51) Int. Cl.
*H04N 1/00* (2006.01)

(52) U.S. Cl.
CPC ....... *H04N 1/00957* (2013.01); *H04N 1/00204* (2013.01); *H04N 1/00954* (2013.01); *H04N 2201/001* (2013.01); *H04N 2201/0039* (2013.01); *H04N 2201/0094* (2013.01)

(58) Field of Classification Search
USPC ............. 358/1.15, 1.9, 2.1; 715/734–740
See application file for complete search history.

(56) References Cited

U.S. PATENT DOCUMENTS

| | | | | |
|---|---|---|---|---|
| 6,567,184 B2* | 5/2003 | Aoki | ............................ | 358/1.15 |
| 6,631,008 B2* | 10/2003 | Aoki | ............................ | 358/1.15 |
| 7,102,778 B2* | 9/2006 | Parry | ............................ | 358/1.15 |
| 7,312,884 B1* | 12/2007 | Makitani | ........................ | 358/1.15 |
| 7,461,138 B2* | 12/2008 | Mukaiyama | ........... | G06F 3/1204 358/1.15 |
| 7,574,485 B2* | 8/2009 | Kraslavsky | ................... | 709/217 |
| 7,640,295 B2* | 12/2009 | Taylor et al. | .................. | 709/203 |
| 8,146,152 B2 | 3/2012 | Homma | ........................ | 726/17 |
| 8,743,388 B2* | 6/2014 | Ahmed et al. | ................ | 358/1.15 |
| 2004/0192426 A1 | 9/2004 | Masui et al. | ..................... | 463/16 |
| 2006/0218541 A1* | 9/2006 | Saito | ................... | G06F 9/44521 717/146 |
| 2009/0201554 A1* | 8/2009 | Tokumoto | ................... | 358/1.16 |
| 2012/0036470 A1 | 2/2012 | Homma | ........................ | 715/777 |
| 2012/0218594 A1* | 8/2012 | Komine | ............... | G06F 3/1211 358/1.15 |

FOREIGN PATENT DOCUMENTS

| | | |
|---|---|---|
| JP | 2004-288091 A | 10/2004 |
| JP | 2005-275476 A | 10/2005 |

\* cited by examiner

*Primary Examiner* — Barbara Reinier
(74) *Attorney, Agent, or Firm* — Fitzpatrick, Cella, Harper & Scinto

(57) ABSTRACT

The storage unit stores first ability information indicating an image processing ability of each of the plurality of image reading apparatuses and second ability information indicating an image processing ability of the image processing apparatus. The accepted job is instructed to execute by any one of the plurality of image reading apparatuses and specifies at least image processing. The selecting is performed on either an image reading apparatus instructing to execute the job or the image processing apparatus based on the first ability information and the second ability information. When the image reading apparatus is selected, the image reading apparatus is controlled to execute the image processing specified in the job. When the image processing apparatus is selected, the image processing apparatus is controlled to execute the image processing specified in the job on data read by the image reading apparatus.

5 Claims, 12 Drawing Sheets

```
<?xml version="1.0" encoding="utf-8"?>
<purposeticket id="79c11d7c-0008-1000-8666-000ffe5080db" purposeticketname="EXPENSE CLAIM" date="20110427150525" >
<purpose>RECEIPT SCAN</purpose>
</purposeticket>
```

FIG. 4

SPECIFY THE PURPOSE TICKET DATA AND CLICK THE [GENERATE PURPOSE TICKET] BUTTON.

NAME: EXPENSE CLAIM

PURPOSE: RECEIPT SCAN ▽

GENERATE PURPOSE TICKET

FIG. 5

| PURPOSE | SCAN SIZE | RESOLUTION | COLOR MODE | DOCUMENT QUALITY | IMAGE QUALITY ADJUSTMENT | FILE FORMAT | DESTINATION |
|---|---|---|---|---|---|---|---|
| RECEIPT SCAN | AUTO | 300×300 | BLACK-AND-WHITE | TEXT | GROUND COLOR REMOVAL | PDF(OCR) | http://receipt.ca.co.jp/ |
| CONFERENCE MATERIAL SCAN | AUTO | 300×300 | FULL-COLOR | TEXT / PHOTOGRAPH | BLEED-THROUGH PREVENTION | PDF(OCR) | http://receipt.ca.co.jp/ |
| PHOTOGRAPH SCAN | AUTO | MAX | FULL-COLOR | PHOTO PAPER | AUTO | JPEG | http://fileshare.ca.co.jp/ |

FIG. 6A

| SCANNING CAPABILITIES | | PROCESSING APPARATUS | | | |
|---|---|---|---|---|---|
| CATEGORY | DETAILS | IMAGE PROCESSING | FILE TRANSFER | PURPOSE TICKET EXECUTION STARTING A | PURPOSE TICKET EXECUTION STARTING B |
| SCAN SIZE | | | | | |
| | AUTO | - | - | V2.0 | V1.0 |
| | A4 | - | - | V2.0 | V1.0 |
| | A3 | - | - | V2.0 | V1.0 |
| RESOLUTION | | | | | |
| | 300x300 | - | - | V2.0 | V1.0 |
| | 600x600 | - | - | V2.0 | V1.0 |
| | 1200x1200 | - | - | - | - |
| COLOR MODE | | | | | |
| | BLACK-AND-WHITE | - | - | V2.0 | V1.0 |
| | GRAYSCALE | - | - | V2.0 | V1.0 |
| | FULL-COLOR | - | - | V2.0 | V1.0 |
| DOCUMENT QUALITY | | | | | |
| | TEXT | - | - | V2.0 | V1.0 |
| | TEXT / PHOTOGRAPH | - | - | V2.0 | V1.0 |
| | PHOTO PAPER | - | - | V2.0 | V1.0 |

F I G. 6B

IMAGE PROCESSING CAPABILITIES

| CATEGORY | DETAILS | PROCESSING APPARATUS ||||
| --- | --- | --- | --- | --- | --- |
| | | IMAGE PROCESSING | FILE TRANSFER | PURPOSE TICKET EXECUTION STARTING A | PURPOSE TICKET EXECUTION STARTING B |
| IMAGE QUALITY ADJUSTMENT | | | | | |
| | AUTO | V1.1 | - | V1.0 | V1.0 |
| | BLEED-THROUGH PREVENTION | V1.1 | - | V1.0 | V1.0 |
| | GROUND COLOR REMOVAL | V1.1 | - | V1.0 | V1.0 |
| FILE FORMAT | | | | | |
| | PDF | V1.1 | - | V1.0 | V1.0 |
| | PDF(OCR) | V1.1 | - | V1.0 | V1.0 |
| | BMP | - | - | V1.0 | V1.0 |
| | JPEG | V1.1 | - | V1.0 | V1.0 |

601

FILE TRANSFER CAPABILITIES

| CATEGORY | DETAILS | PROCESSING APPARATUS ||||
| --- | --- | --- | --- | --- | --- |
| | | IMAGE PROCESSING | FILE TRANSFER | PURPOSE TICKET EXECUTION STARTING A | PURPOSE TICKET EXECUTION STARTING B |
| DESTINATION | | | | | |
| | http://fileshare.ca.co.jp/ | - | - | V1.0 | V1.0 |
| | http://receipt.ca.co.jp/ | - | V1.1 | - | - |

```xml
<?xml version="1.0" encoding="utf-8"?>
<jobticket id="79c11d7c-0008-1000-8666-000ffe5080db"device="PURPOSE TICKET EXECUTION STARTING APPARATUS A" date="20110427160843">
  <job id="Scan">
    <ElementSetting>
      <Element id="E_DOCUMENT_SIZE">
        <Item id="IT_DOCUMENT_SIZE">AUTO</Item>
      </Element>
      <Element id="E_RESOLUTION">
        <Item id="IT_RESOLUTION">DPI_300X300</Item>
      </Element>
      <Element id="E_COLOR_MODE">
        <Item id="IT_COLOR_MODE">BLACK_AND_WHITE</Item>
      </Element>
      <Element id="E_ORIGINAL_TYPE">
        <Item id="IT_ORIGINAL_TYPE">TEXT</Item>
      </Element>
    </ElementSetting>
  </job>
  <job id="Imaging">
    <ElementSetting>
      <Element id="E_FILE_FORMAT">
        <Item id="IT_FILE_FORMAT">BMP</Item>
      </Element>
    </ElementSetting>
  </job>
  <job id="Send">
    <ElementSetting>
      <Element id="E_DESTINATION">
        <Item id="IT_DESTINATION_ADDRESS">http://imaging.ca.co.jp</Item>
      </Element>
    </ElementSetting>
  </job>
</jobticket>
```

```xml
<?xml version="1.0" encoding="utf-8"?>
<jobticket id="79c11d7c-0008-1000-8666-000ffe5080db" device="IMAGE PROCESSING APPARATUS" date="20110427160843">
  <job id="Imaging">
    <ElementSetting>
      <Element id="E_IMAGE_QUALITY_ADJUSTMENT">
        <Item id="IT_IMAGE_QUALITY_ADJUSTMENT">REMOVE_BACKGROUND</Item>
      </Element>
      <Element id="E_FILE_FORMAT">
        <Item id="IT_FILE_FORMAT">PDF</Item>
      </Element>
    </ElementSetting>
  </jpb>
  <job id="Send">
    <ElementSetting>
      <Element id="E_DESTINATION">
        <Item id="IT_DESTINATION_ADDRESS">http://filetransfer.ca.co.jp</Item>
      </Element>
    </ElementSetting>
  </job>
</jobticket>
```

FIG. 9

```
<?xml version="1.0" encoding="utf-8"?>
<jobticket id="79c11d7c-0008-1000-8666-000ffe5080db" device="FILE TRANSFER APPARATUS" date="20110427160843">
<job id="Send">
<ElementSetting>
<Element id="E_DESTINATION">
<Item id="IT_DESTINATION_ADDRESS">http://receipt.ca.co.jp/</Item>
</Element>
</ElementSetting>
</job>
</jobticket>
```

F I G. 10
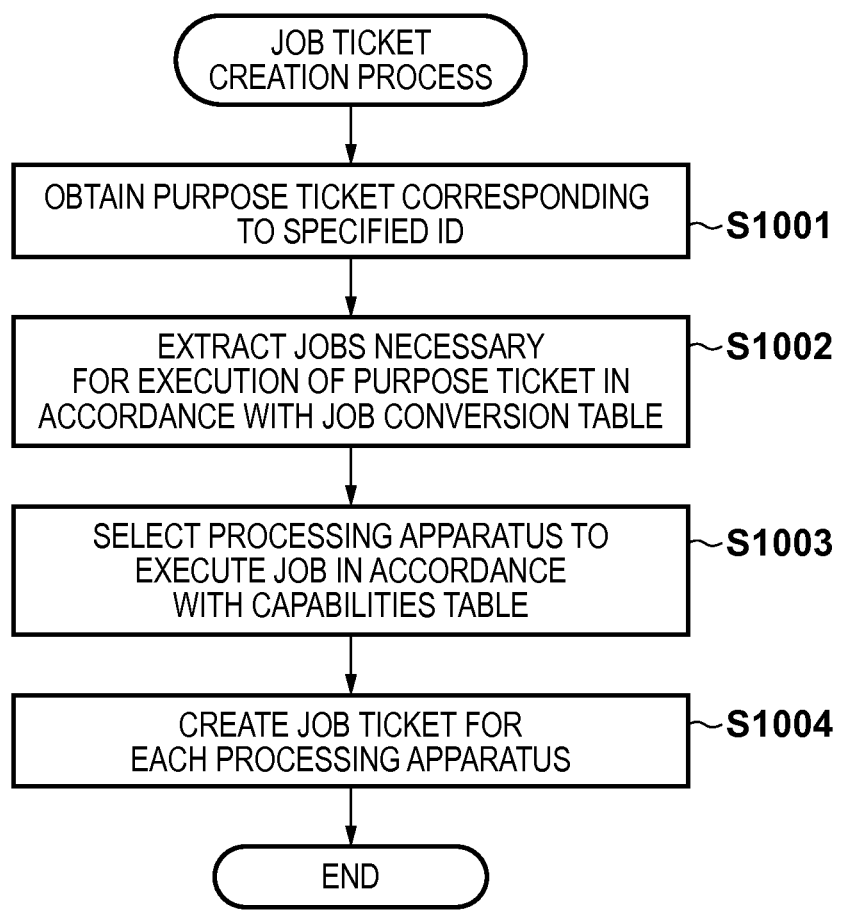

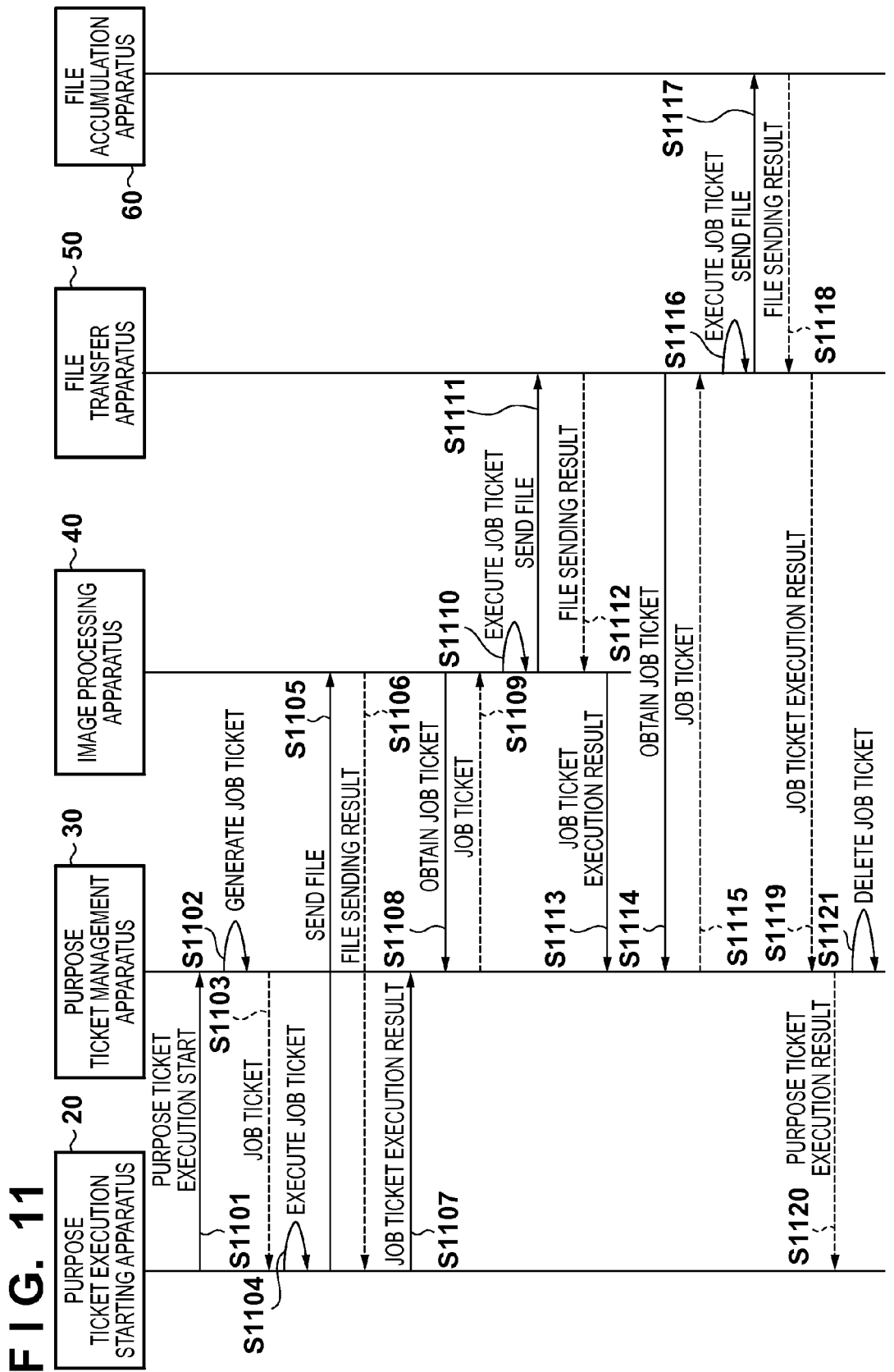

NETWORK SYSTEM AND IMAGE PROCESSING APPARATUS FOR COORDINATED PROCESSING, CONTROL METHOD THEREOF, AND STORAGE MEDIUM

BACKGROUND OF THE INVENTION

1. Field of the Invention

The present invention relates to network system, image processing apparatuses, controlling methods, and storage medium storing programs that perform coordinated control of multiple apparatuses.

2. Description of the Related Art

Techniques that coordinate multiple apparatuses on the Internet and execute processing have been known for some time. Japanese Patent Laid-Open No. 2004-288091 discloses implementing a desired service for a user by coordinating multiple apparatuses and executing processing in accordance with descriptions written in a ticket created in advance.

In Japanese Patent Laid-Open No. 2004-288091, which apparatus will execute what type of process (job) is set in the ticket in advance. However, for this reason, in the case where a function has been added to one device and coordinated processing is to be executed using that function, it has been necessary to change the ticket in advance in response to the addition of the function.

SUMMARY OF THE INVENTION

An aspect of the present invention is to eliminate the above-mentioned problems with the conventional technology. The present invention provides an information processing apparatus, an information processing method, and a storage medium storing a program that realize coordinated processing utilizing optimal apparatuses.

The present invention in its first aspect provides a network system including a plurality of image reading apparatuses and an image processing apparatus, the system comprising: a storage unit configured to store first ability information indicating an image processing ability of each of the plurality of image reading apparatuses and second ability information indicating an image processing ability of the image processing apparatus; an accepting unit configured to accept an job, wherein the job is instructed to execute by any one of the plurality of image reading apparatuses and wherein the job specifies at least image processing; a selecting unit configured to select an image reading apparatus instructing to execute the job or the image processing apparatus based on the first ability information and the second ability information in a case where the accepting unit accepts the job; a controlling unit configured to control the image reading apparatus to execute the image processing specified in the job in a case where the selecting unit selects the image reading apparatus, and to control the image processing apparatus to execute the image processing specified in the job on data read by the image reading apparatus in a case where the selecting unit selects the image processing apparatus.

The present invention in its second aspect provides an image processing apparatus which is able to communicate with a plurality of image reading apparatuses, the apparatus comprising: a storage unit configured to store an ability information indicating an image processing ability of each of the plurality of image reading apparatuses; an accepting unit configured to accept an job, wherein the job is instructed to execute by any one of the plurality of image reading apparatuses and wherein the job specifies at least image processing; a selecting unit configured to select an image reading apparatus instructing to execute the job or the image processing apparatus based on the ability information stored in said storage unit, so that the selected apparatus has higher ability for executing the image processing; a controlling unit configured to control the image reading apparatus to execute the image processing specified in the job in a case where the selecting unit selects the image reading apparatus, and to control the image processing apparatus to execute the image processing specified in the job on data read by the image reading apparatus in a case where the selecting unit selects the image processing apparatus.

The present invention in its third aspect provides a controlling method of an image processing apparatus which is able to communicate with a plurality of image reading apparatuses, the method comprising: a storage step of storing ability information indicating an image processing ability of each of the plurality of image reading apparatuses; an accepting step of accepting an job, wherein the job is instructed to execute by any one of the plurality of image reading apparatuses and wherein the job specifies at least image processing; a selecting step of selecting an image reading apparatus instructing to execute the job or the image processing apparatus based on the ability information stored in the storage unit, so that the selected apparatus has higher ability for executing the image processing; a controlling step of controlling the image reading apparatus to execute the image processing specified in the job in a case where the selecting step selects the image reading apparatus, and controlling the image processing apparatus to execute the image processing specified in the job on data read by the image reading apparatus in a case where the selecting step selects the image processing apparatus.

The present invention in its fourth aspect provides a computer-readable medium storing a program causing a computer to execute: a storage step of storing ability information indicating an image processing ability of each of the plurality of image reading apparatuses; an accepting step of accepting an job, wherein the job is instructed to execute by any one of the plurality of image reading apparatuses and wherein the job specifies at least image processing; a selecting step of selecting an image reading apparatus instructing to execute the job or the image processing apparatus based on the ability information stored in the storage unit, so that the selected apparatus has higher ability for executing the image processing; a controlling step of controlling the image reading apparatus to execute the image processing specified in the job in a case where the selecting step selects the image reading apparatus, and controlling the image processing apparatus to execute the image processing specified in the job on data read by the image reading apparatus in a case where the selecting step selects the image processing apparatus.

According to the present invention, it is possible to realize coordinated processing utilizing optimal apparatuses.

Further features of the present invention will become apparent from the following description of an exemplary embodiment with reference to the attached drawings.

BRIEF DESCRIPTION OF THE DRAWINGS

FIG. 4 is a diagram illustrating an example of a purpose ticket creation service page.

FIG. 5 is a diagram illustrating an example of a job conversion table.

FIGS. 6A and 6B are diagrams illustrating an example of an apparatus capabilities table.

FIG. 7 is a diagram illustrating an example of a job ticket for a purpose ticket execution starting apparatus.

FIG. 8 is a diagram illustrating a job ticket for an image processing apparatus.

FIG. 9 is a diagram illustrating a job ticket for a file transfer processing apparatus.

FIG. 10 is a flowchart illustrating a procedure for a job ticket generation process.

FIG. 11 is a flowchart illustrating a procedure for a purpose ticket service execution process.

DESCRIPTION OF THE EMBODIMENTS

Figure 1:
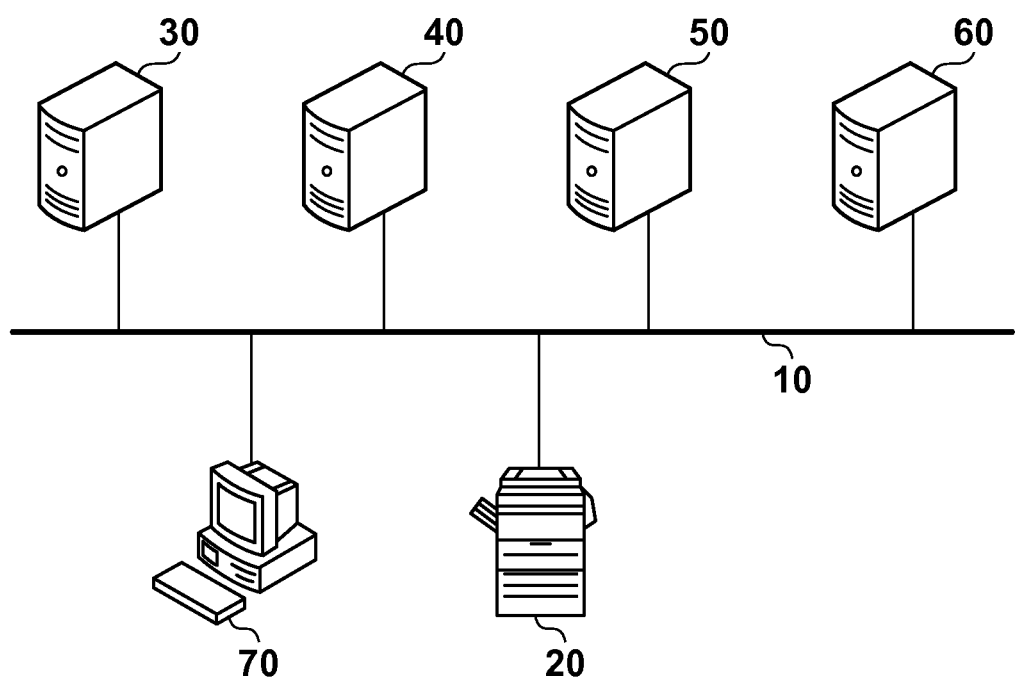
FIG. 1 is a diagram illustrating the configuration of an information processing system.

A preferred embodiment of the present invention will now be described hereinafter in detail, with reference to the accompanying drawings. It is to be understood that the following embodiment is not intended to limit the claims of the present invention, and that not all of the combinations of the aspects that are described according to the following embodiment are necessarily required with respect to the means to solve the problems according to the present invention. Note that identical constituent elements will be given identical reference numerals, and descriptions thereof will be omitted.

First Embodiment

FIG. 1 is a diagram illustrating the configuration of an information processing system according to an embodiment of the present invention. This system includes a purpose ticket execution starting apparatus 20, a purpose ticket management apparatus 30, an image processing apparatus 40, a file transfer apparatus 50, a file accumulation apparatus 60, and a client PC 70. These apparatuses are, for example, information processing apparatuses such as generic PCs, and are communicably connected to each other via a network 10. When there is no particular need to distinguish individual apparatuses using the above names, they will be referred to simply as "information processing apparatuses" hereinafter. As with a generic PC, each information processing apparatus shown in FIG. 1 includes a CPU, a hard disk (HDD), a ROM, a RAM, a display, a pointing device, a keyboard, and the like. The CPU controls the information processing apparatus as a whole, and, for example, expands programs loaded from the hard disk, the ROM, or the like in the RAM and executes those programs. The HDD stores programs that execute processes illustrated in flowcharts that will be mentioned later, image data, and so on. The display displays a user interface, and is controlled by a display driver. The user can carry out various types of instructions for the information processing apparatus by operating the user interface displayed in the display using the pointing device, the keyboard, or the like.

The purpose ticket management apparatus 30 manages purpose tickets, in which information for executing various services to be provided to the user by the system is written. The purpose ticket management apparatus 30 also holds purpose tickets created in response to user instructions. In response to a request from another information processing apparatus connected via the network 10, the purpose ticket management apparatus 30 creates a job ticket for executing a job using the various information processing apparatuses from the information written in the purpose ticket, and distributes the job ticket to the various information processing apparatuses. In addition, the purpose ticket management apparatus 30 executes a desired coordinated service for a user by coordinating various information processing apparatuses connected to the network 10.

The client PC 70 creates a purpose ticket for executing the desired coordinated service for the user (called simply a "service" hereinafter) in accordance with an instruction from the user. The user creates the purpose ticket for executing the desired service by accessing a purpose ticket creation service provided by the purpose ticket management apparatus 30 via a web browser in the client PC 70. The purpose ticket created in accordance with the instruction from the user is saved in a storage unit, such as the hard disk, within the purpose ticket management apparatus 30.

The purpose ticket execution starting apparatus 20 starts the execution of the processing specified in the purpose ticket in accordance with an instruction from the user. In the present embodiment, an MFP (multifunctional peripheral), for example, is used as the purpose ticket execution starting apparatus 20. However, an apparatus aside from an MFP may be used as the purpose ticket execution starting apparatus 20 as long as that apparatus has a user interface for accepting instructions from the user. Upon accepting a purpose ticket obtainment instruction from the user, the purpose ticket execution starting apparatus 20 obtains the information of multiple purpose tickets held by the purpose ticket management apparatus 30 and displays that information in the display of the purpose ticket execution starting apparatus 20. When the user then selects a desired purpose ticket from among the multiple displayed purpose tickets, the purpose ticket management apparatus 30 is notified of the selected purpose ticket. Having received the notification, the purpose ticket management apparatus 30 generates configuration information (or, setting information) for a job to be executed by the purpose ticket execution starting apparatus 20 based on the details written in the purpose ticket selected by the user, and sends the job configuration information to the purpose ticket execution starting apparatus 20. Having received the job configuration information, the purpose ticket execution starting apparatus 20 starts processing for executing the services written in the purpose ticket in accordance with the job configuration information. The image processing apparatus 40 performs vector conversion, image compression, decompression processing, file conversion processing, and so on on image data. The file transfer apparatus 50 transfers a file to the file accumulation apparatus 60. The file accumulation apparatus 60 accumulates files transferred from the file transfer apparatus 50.

Figure 2:
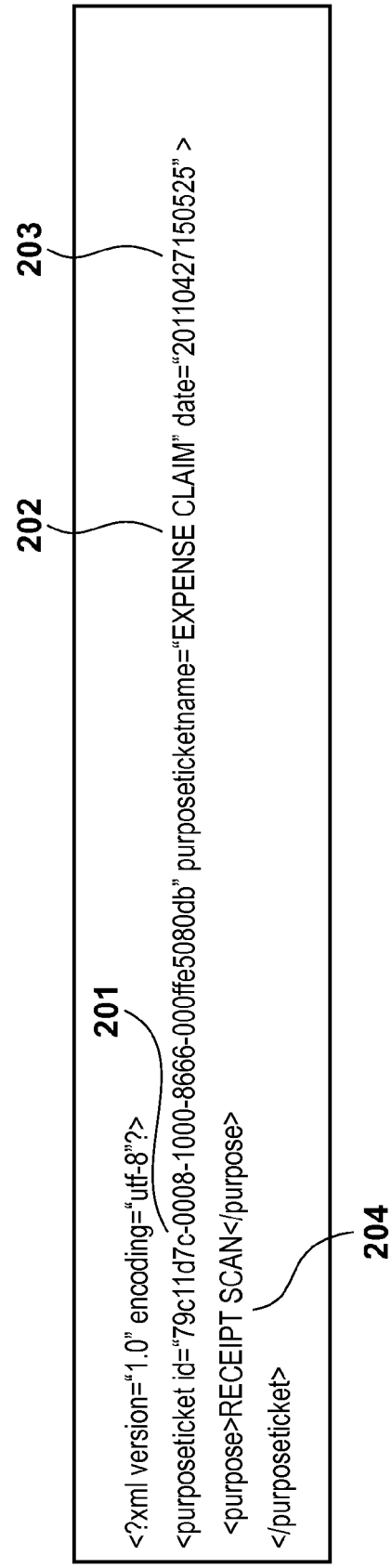
FIG. 2 is a diagram illustrating an example of a purpose ticket.

Next, the purpose ticket according to the present embodiment will be described with reference FIG. 2. FIG. 2 is a diagram illustrating an example of the purpose ticket according to the present embodiment. The purpose ticket is a definition file that defines a service to be executed by coordinating the functions of the multiple information processing apparatuses shown in FIG. 1. The purpose ticket is a structured file written in, for example, XML (eXtended Markup Language). As shown in FIG. 2, the purpose ticket includes id information 201, purposeticketname information 202, date information 203, and purpose information 204. The id information 201 is information indicating a management number for the purpose ticket, and uses, for example, a UUID (Universally Unique Identifier). The purposeticketname information 202 indicates the name of the purpose ticket, and can be set by the user. The date information 203 indicates the date/time when the purpose ticket was generated. The purpose information 204 indicates the name of the service executed by the purpose ticket.

Creation of Purpose Ticket

Figure 3:
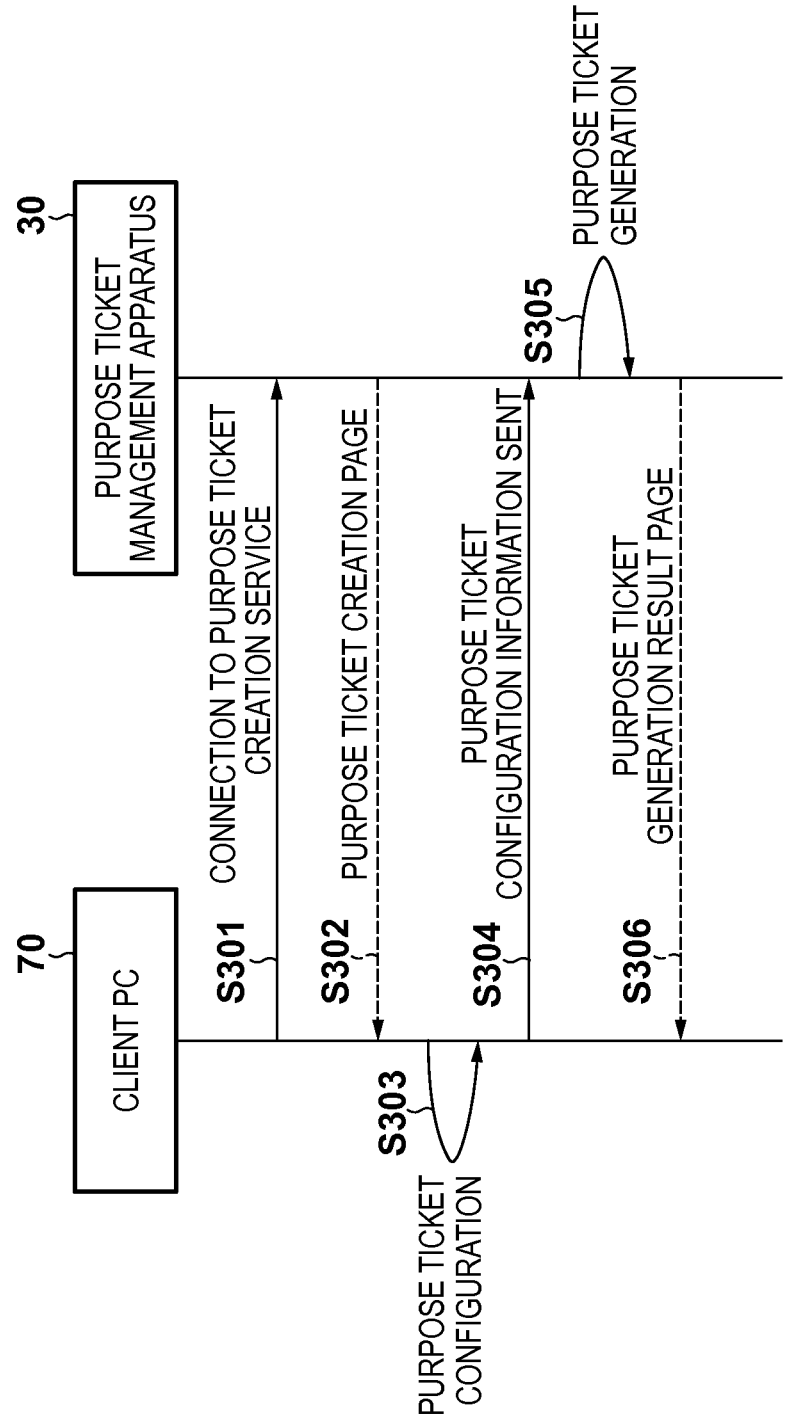
FIG. 3 is a flowchart illustrating a procedure for a purpose ticket creation process.

The creation of the purpose ticket will now be described with reference to FIGS. 3 and 4. FIG. 3 is a flowchart illustrating a procedure for a purpose ticket creation process carried out between the client PC 70 and the purpose ticket management apparatus 30. The various processes performed by the client PC 70 as shown in FIG. 3 are, for example, executed by the CPU of the client PC 70. Likewise, the various processes performed by the purpose ticket management apparatus 30 as shown in FIG. 3 are, for example, executed by the CPU of the purpose ticket management apparatus 30. In S301, the client PC 70 accesses the purpose ticket creation service provided by the purpose ticket management apparatus 30 as a result of the user operating the web browser. In S302, the purpose ticket management apparatus 30 sends, to the client PC 70, purpose ticket creation service page information for displaying, to the user, a webpage for creating the purpose ticket. In S303, the client PC 70 displays the purpose ticket creation service page and accepts the input of data from the user.

FIG. 4 is a diagram illustrating an example of the purpose ticket creation service page. Through the displayed purpose ticket creation service page, the client PC 70 accepts the setting of service name and service purpose items from the user. In the present embodiment, the client PC 70 accepts the setting of "expense claim" as the service name and "receipt scan" as the service purpose from the user. Here, multiple types of service purpose items are prepared in advance, and the user sets the service purpose by selecting a desired service purpose.

FIG. 3 will now be discussed again. In S304 of FIG. 3, the client PC 70 sends, to the purpose ticket management apparatus 30, the setting information accepted from the user through the purpose ticket creation service page. In S305, the purpose ticket management apparatus 30 creates the purpose ticket based on the received setting information. The purpose ticket illustrated in FIG. 2 is an example of the purpose ticket created in S305, based on setting information such as that shown in FIG. 4 (that is, with a service name of "expense claim" and a service purpose of "receipt scan"). In S306, the purpose ticket management apparatus 30 sends, to the client PC 70, page information for displaying, to the user, a webpage that shows the result of generating the purpose ticket. The client PC 70 displays the result of generating the purpose ticket, such as whether the generation of the purpose ticket succeeded or failed, to the user based on the received page information.

Job Ticket Generation

Next, the generation of a job ticket will be described with reference to FIGS. 5 through 9. In the present embodiment, when the service written in a purpose ticket is to be executed, it is determined which information processing apparatuses will be used to execute that service as well as what order those apparatuses will be used in, and a job ticket is generated for each of the information processing apparatuses. The job ticket is an instruction file in which the order of the processes to be executed by the respective information processing apparatuses is written as execution commands, and is generated by the purpose ticket management apparatus 30 based on the purpose ticket information, information from a job conversion table illustrated in FIG. 5, and information from an apparatus capabilities table illustrated in FIGS. 6A and 6B. A procedure for a job ticket generation process will now be described with reference to FIG. 10. The generated job tickets are distributed to the respective information processing apparatuses in response to job ticket obtainment requests from those information processing apparatuses, and the information processing apparatuses that received the job tickets execute the jobs in sequence in accordance with the descriptions in the job tickets.

Hereinafter, the generation of the job ticket will be described. FIG. 5 is a diagram illustrating an example of a job conversion table according to the present embodiment. The job conversion table associates the service purpose of the purpose ticket with each piece of job configuration information for executing that service purpose, and is stored in the hard disk or the like of the purpose ticket management apparatus 30. As shown in FIG. 5, the job conversion table includes purpose information 501 and job configuration information 502. The purpose information 501 indicates the service purpose of the purpose ticket. The job configuration information 502 indicates configuration information for each job required to execute the service purpose of the purpose ticket. For example, "scan size", "resolution", "color mode", and "document quality" are items in the job configuration information of a scan job. A scan job is a job that executes a scanning process. Meanwhile, "quality adjustment" and "file format" are items in the job configuration information of an image processing job. An image processing job is a job that executes image processing. Meanwhile, "destination" is an item in the job configuration information of a sending job. A sending job is a job that executes a sending process. The job configuration information 502 indicated in FIG. 5 may, for example, express the execution sequence of the jobs from left to right. For example, in FIG. 5, a scan job, and image processing job, and a sending job are processed in that order to execute the services of a receipt scan, a conference material scan, and a photograph scan.

FIGS. 6A and 6B are diagrams illustrating an example of an apparatus capabilities table according to the present embodiment. The apparatus capabilities table is a table for managing the capabilities of the respective information processing apparatuses shown in FIG. 1, and is stored in the hard disk or the like of the purpose ticket management apparatus 30. As shown in FIGS. 6A and 6B, the apparatus capabilities table includes executable jobs 601 and execution capabilities 602. The executable jobs 601 indicates the job configuration information of the jobs executed by the respective information processing apparatuses. The executable jobs 601 are the same as the items in the job configuration information 502 shown in FIG. 5. The execution capabilities 602 indicates the extents of the capabilities (or performance) of the respective information processing apparatuses that execute the jobs indicated in the executable jobs 601. In the present embodiment, version information of a library, module, or the like is used as the information indicating the extents of the capabilities, and for example, "V1.1" expresses that the capability to execute a job is higher than "V1.0". In other words, when executing the corresponding job, an information processing apparatus having capabilities indicated as "V1.1" is the more suitable choice. In FIGS. 6A and 6B, the extents of the capabilities are indicated by the version information, but the extents of the capabilities may also be indicated by the date of creation or the like of the library or module for executing the job.

FIG. 10 is a flowchart illustrating a procedure for a job ticket generation process according to the present embodiment. The job ticket generation process illustrated in FIG. 10 is carried out when the purpose ticket management apparatus 30 has received a purpose ticket service execution instruction from the purpose ticket execution starting apparatus 20. The following descriptions assume that a service execution instruction for a purpose ticket such as that shown in FIG. 2 has been received from the purpose ticket execution starting apparatus 20. The processes illustrated in FIG. 10 are, for example, executed by the CPU of the purpose ticket management apparatus 30.

In S1001, the purpose ticket management apparatus 30 obtains the purpose ticket corresponding to the ID of the service whose execution has been instructed to start by the purpose ticket execution starting apparatus 20. For example, a purpose ticket corresponding to an ID of "79c11d7c-0008-1000-8666-000ffe5080 db" is obtained. In S1002, the purpose ticket management apparatus 30 extracts the job configuration information of the respective jobs required to execute the service of the purpose ticket, by referring to the job conversion table shown in FIG. 5. In the present embodiment, the job configuration information 502 corresponding to a service purpose of "receipt scan" is extracted. In other words, the job configuration information 502 for a scan job is extracted in order to execute the specified service purpose of "receipt scan". Here, "auto" is extracted as the scan size, "300×300" is extracted as the resolution, "black-and-white" is extracted as the color mode, and "text" is extracted as the document quality. In addition, the job configuration information 502 for an image processing job is extracted. Here, "ground color removal" is extracted as the image quality adjustment, and "PDF (OCR)" is extracted as the file format. Furthermore, the job configuration information 502 for a sending job is extracted. Here, "http://receipt.ca.co.jp/" is extracted as the destination. In the embodiment, "print-through removal" is extracted as the image quality adjustment. Here, the "print-through prevention" (or, bleed-through prevention) is a processing applied to the printed product in which the printing is translucent to the back of the printed product.

In S1003, the optimal information processing apparatuses for executing the respective jobs are selected by referring to the apparatus capabilities table shown in FIGS. 6A and 6B based on the job configuration information 502 extracted in S1002. As shown in FIGS. 6A and 6B, the execution capability for a purpose ticket execution starting apparatus A to execute a scan job is indicated as "V2.0", which is higher than the execution capability of "V1.0" for a purpose ticket execution starting apparatus B to execute the scan job. Accordingly, the purpose ticket execution starting apparatus A is selected as the optimal information processing apparatus for executing the scan job. Here, it is assumed that two purpose ticket execution starting apparatuses 20 are connected to the network 10 shown in FIG. 1.

In addition, as shown in FIGS. 6A and 6B, the execution capability for the image processing apparatus 40 to execute an image processing job is indicated as "V1.1", which is higher than the execution capabilities of the other information processing apparatuses to execute the image processing job. Accordingly, the image processing apparatus 40 is selected as the optimal information processing apparatus for executing the image processing job. In addition, as shown in FIGS. 6A and 6B, the execution capability for the file transfer apparatus 50 to execute a sending job is indicated as "V1.1", which is higher than the execution capabilities of the other information processing apparatuses to execute the sending job. Accordingly, the file transfer apparatus 50 is selected as the optimal information processing apparatus for executing the sending job.

In S1004, a job ticket is generated for each of the information processing apparatuses selected in S1003.

FIG. 7 is a diagram illustrating an example of the job ticket generated in S1004. As shown in FIG. 7, the job ticket includes id information 701, device information 702, date information 703, scan job configuration information 704, image processing job configuration information 705, and sending job configuration information 706. The id information 701 is information indicating the management number of the purpose ticket, and for example, a UUID indicating the id information 201 shown in FIG. 2 is used. In other words, the management number is the same value as the id information 201 of the purpose ticket. The device information 702 indicates the name of the optimal information processing apparatus for that job ticket. The date information 703 indicates the date/time when the job ticket was created. The scan job configuration information 704 is configuration information for the scan job to be executed by the corresponding information processing apparatus. The image processing job configuration information 705 is configuration information for the image processing job to be executed by the corresponding information processing apparatus. The sending job configuration information 706 is configuration information for the sending job to be executed by the corresponding information processing apparatus. Note that FIG. 7 illustrates a job ticket for the purpose ticket execution starting apparatus 20. Meanwhile, FIG. 8 illustrates a job ticket for the image processing apparatus 40. Likewise, FIG. 9 illustrates a job ticket for the file transfer apparatus 50.

Purpose Ticket Service Execution

The purpose ticket service execution process will now be described with reference to FIG. 11. FIG. 11 is a flowchart illustrating a procedure for the purpose ticket service execution process according to the present embodiment. The processes performed by the purpose ticket execution starting apparatus 20 illustrated in FIG. 11 are, for example, executed by the CPU of the purpose ticket execution starting apparatus 20. Likewise, the processes performed by the purpose ticket management apparatus 30 as shown in FIG. 11 are, for example, executed by the CPU of the purpose ticket management apparatus 30. Furthermore, the processes performed by the image processing apparatus 40 as shown in FIG. 11 are, for example, executed by the CPU of the image processing apparatus 40. Further still, the processes performed by the file transfer apparatus 50 as shown in FIG. 11 are, for example, executed by the CPU of the file transfer apparatus 50. Finally, the processes performed by the file accumulation apparatus 60 as shown in FIG. 11 are, for example, executed by the CPU of the file accumulation apparatus 60.

In S1101, the purpose ticket execution starting apparatus 20 notifies the purpose ticket management apparatus 30 of the start of service execution for the purpose ticket selected by the user. This may be a configuration in which, for example, the user notifies the purpose ticket management apparatus 30 via a web browser of the purpose ticket execution starting apparatus 20. In S1102, upon receiving the notification of the start of service execution for the purpose ticket, the purpose ticket management apparatus 30 selects the various information processing apparatuses required to execute that service purpose, and generates job tickets in which the configuration information for the jobs to be executed by the respective information processing apparatuses is written. The processing in S1102 is the same as that described with reference to FIG. 10. In S1103, the purpose ticket management apparatus 30 sends, to the purpose ticket execution starting apparatus 20, the job ticket in which the job configuration information for a scan job to be executed by the purpose ticket execution starting apparatus 20 is written. Here, the job ticket that is sent to the purpose ticket execution starting apparatus 20 is the job ticket illustrated in FIG. 7. Here, the job ticket is sent to the purpose ticket execution starting apparatus 20 in S1103 because, when executing the service desired by the user, the scan job is executed first, and the information processing apparatus that executes the scan job is the purpose ticket execution starting apparatus 20.

In S1104, the purpose ticket execution starting apparatus 20 executes the scan job in accordance with the job ticket, such as that shown in FIG. 7, received in S1103. In S1104, the purpose ticket execution starting apparatus 20 scans a document and generates image data. In S1105, the purpose ticket execution starting apparatus 20 sends, to the destination written in the job ticket, a file including the generated image data and the ID of the purpose ticket. Here, the destination written in the job ticket is "http://imaging.ca.co.jp" as written in the sending job configuration information 706 shown in FIG. 7, or in other words, is the image processing apparatus 40. In other words, the destination written in the job ticket can also be called a coordination destination that is moved to after one of the information processing apparatuses that executes the service desired by the user has executed its job. In addition, the purpose ticket ID is the ID indicated by the id information 701. In S1106, upon receiving the file, the image processing apparatus 40 responds to the purpose ticket execution starting apparatus 20 regarding the result of the file sending, such as that the sending was successfully completed. In S1107, the purpose ticket execution starting apparatus 20 notifies the purpose ticket management apparatus 30 of the result of the scan job execution as executed by the purpose ticket execution starting apparatus 20.

In S1108, the image processing apparatus 40 extracts the ID of the purpose ticket from the file received from the purpose ticket management apparatus 30 in S1105. The image processing apparatus 40 then sends, to the purpose ticket management apparatus 30, a request for obtaining the job ticket, associated with that ID, in which the job configuration information for the image processing job to be executed by the image processing apparatus 40 is written. In response to the obtainment request from the image processing apparatus 40 in S1108, in S1109, the purpose ticket management apparatus 30 sends, to the image processing apparatus 40, the job ticket, associated with the purpose ticket ID, in which the job configuration information for the image processing job to be executed by the image processing apparatus 40 is written. Here, the job ticket that is sent to the image processing apparatus 40 is the job ticket illustrated in FIG. 8.

In S1110, the image processing apparatus 40 executes the image processing job in accordance with the job ticket, such as that shown in FIG. 8, received in S1109. In S1110, the image processing apparatus 40 performs image processing on the image data received from the purpose ticket execution starting apparatus 20 in S1105. In S1111, the image processing apparatus 40 sends, to the destination written in the job ticket, a file including the processed image data and the ID of the purpose ticket. Here, the destination written in the job ticket is "http://filetransfer.ca.co.jp", as shown in FIG. 8, or in other words, the file transfer apparatus 50. Meanwhile, the purpose ticket ID is "79c11d7c-0008-1000-8666-000ffe5080 db", as shown in FIG. 8. In S1112, upon receiving the file, the file transfer apparatus 50 responds to the image processing apparatus 40 regarding the result of the file sending, such as that the sending was successfully completed. In S1113, the image processing apparatus 40 notifies the purpose ticket management apparatus 30 of the execution result of the image processing job executed by the image processing apparatus 40.

In S1114, the file transfer apparatus 50 extracts the ID of the purpose ticket from the file received from the image processing apparatus 40 in S1111. The file transfer apparatus 50 then sends, to the purpose ticket management apparatus 30, a request for obtaining the job ticket, associated with that ID, in which the job configuration information for the sending job to be executed by the file transfer apparatus 50 is written. In S1115, in response to the obtainment request from the file transfer apparatus 50, the purpose ticket management apparatus 30 sends, to the file transfer apparatus 50, the job ticket, associated with the purpose ticket ID, in which the job configuration information for the sending job to be executed by the file transfer apparatus 50 is written. Here, the job ticket that is sent to the file transfer apparatus 50 is the job ticket illustrated in FIG. 9.

In S1116, the file transfer apparatus 50 executes the sending job in accordance with the job ticket, such as that shown in FIG. 9, received in S1115. In S1117, the file transfer apparatus 50 sends, to the destination written in the job ticket, a file including the processed data and the purpose ticket ID received from the file transfer apparatus 50 in S1111. Here, the destination written in the job ticket is "http://receipt.ca.co.jp" indicated in FIG. 9, or in other words, the file accumulation apparatus 60. Meanwhile, the purpose ticket ID is "79c11d7c-0008-1000-8666-000ffe5080 db", as shown in FIG. 9. In S1118, upon receiving the file, the file accumulation apparatus 60 responds to the file transfer apparatus 50 regarding the result of the file sending, such as that the sending was successful. In S1119, the file transfer apparatus 50 notifies the purpose ticket management apparatus 30 of the execution result of the sending job executed by the file transfer apparatus 50.

In S1120, the purpose ticket management apparatus 30 determines the result of the purpose ticket service execution based on the execution result from the purpose ticket execution starting apparatus 20 in S1107, the execution result from the image processing apparatus 40 in S1113, and the execution result from the file transfer apparatus 50 in S1119. The purpose ticket management apparatus 30 then notifies the purpose ticket execution starting apparatus 20 of the result of that purpose ticket service execution. In S1121, the purpose ticket management apparatus 30 deletes the job tickets generated for the respective information processing apparatuses in S1102 from the purpose ticket management apparatus 30.

As described thus far, first, upon receiving an instruction to execute a service desired by the user, the purpose ticket management apparatus 30 refers to the job conversion table in which the service and the required jobs are associated with each other, and confirms the jobs required to execute the service and the configuration information of each of those jobs. Then, the purpose ticket management apparatus 30 refers to the apparatus capabilities table in which the respective jobs are associated with the execution capabilities of the respective information processing apparatuses, and selects the optimal information processing apparatuses for executing each of the jobs. Next, the purpose ticket management apparatus 30 generates a job ticket based on the job configuration information in each of the jobs. When generating the job ticket, the purpose ticket management apparatus 30 writes, in each job ticket, the next destination for the post-execution data obtained after the execution of that job. The next destination is, for example, "http://imaging.ca.co.jp", as shown in FIG. 7.

In the present embodiment, the post-execution data obtained after a given information processing apparatus has executed its job is passed on to another information processing apparatus in sequence. Each information processing apparatus that is second or later in the execution sequence for the multiple jobs (in FIG. 11, the image processing apparatus 40 in the file transfer apparatus 50) requests a job ticket from the purpose ticket management apparatus 30 each time that information processing apparatus receives the post-execution data. At this time, the purpose ticket management apparatus 30 distributes the job tickets generated for the respective information processing apparatuses. Upon executing a job in accordance with the distributed job ticket, each information processing apparatus notifies the purpose ticket management apparatus 30 of the result of that execution, such as that the execution was successfully completed. Doing so makes it possible for the purpose ticket management apparatus 30 to obtain an execution results for each job from each information processing apparatus, which in turn makes it possible to determine a result of executing the service at the point in time when the results of executing the respective jobs necessary for the execution of the service desired by the user have been obtained.

As described thus far, according to the present embodiment, the processing of a purpose ticket can consistently be executed based on the latest capabilities of each information processing apparatus without changing the content of the purpose ticket. Meanwhile, although the present embodiment describes the purpose ticket management apparatus 30, the image processing apparatus 40, the file transfer apparatus 50, and the file accumulation apparatus 60 as separate individual apparatuses, it should be noted that these apparatuses may be configured as a single apparatus.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-013428, filed Jan. 25, 2012, which is hereby incorporated by reference herein in its entirety.

What is claimed is:

1. A network system including an image reading apparatus and an image processing apparatus, each having a specific image process function, the network system comprising:
   a memory device configured to store first version information indicating a version of the specific image process function of the image reading apparatus and second version information indicating a version of the specific image process function of the image processing apparatus; and
   a CPU coupled to the memory device and programmed to provide:
      an accepting unit configured to accept a job to instruct image processing,
      a selecting unit configured to, in a case where the accepting unit accepts the job, compare the first version information and the second version information stored in the memory device and select an apparatus, on which the image processing is to be executed, from the image reading apparatus and the image processing apparatus, based on a result of the comparison,
      wherein the apparatus selected by the selecting unit has a higher capability of executing the image processing instructed by the job, which is indicated by version information, than a capability of another apparatus that is not selected by the selecting unit in executing the image processing instructed by the job, and
      a controller configured to control the image reading apparatus or the image processing apparatus selected by the selecting unit to execute the image processing instructed by the job,
      wherein, in a case where the controller controls the image processing apparatus to execute the image processing instructed by the job, the image processing apparatus receives, from the image reading apparatus, image data generated by scanning in the image reading apparatus, and executes the image processing instructed by the job on the image data, using the specific image process function of the image processing apparatus.

2. The network system according to claim 1, wherein the job specifies sending processing, which sends the image data read by the image reading apparatus.

3. An image processing apparatus and an image reading apparatus configured to communicate with each other, each having a specific image process function, the image processing apparatus comprising:
   a memory device configured to store first version information indicating a version of the specific image process function of the image reading apparatus and second version information indicating a version of the specific image process function of the image processing apparatus; and
   a CPU coupled to the memory device and programmed to provide:
      an accepting unit configured to accept a job to instruct image processing,
      a selecting unit configured to, in a case where the accepting unit accepts the job, compare the first version information and the second version information stored in the memory device and select an apparatus, on which the image processing is to be executed, from the image reading apparatus and the image processing apparatus, based on a result of the comparison,
      wherein the apparatus selected by the selecting unit has higher capability of executing the image processing instructed by the job, which is indicated by version information, than a capability of another apparatus that is not selected by the selecting unit in executing the image processing instructed by the job, and
      a controller configured to control the image reading apparatus or the image processing apparatus selected by the selecting unit to execute the image processing instructed by the job,
      wherein, in a case where the controller controls the image processing apparatus to execute the image processing instructed by the job, the image processing apparatus receives, from the image reading apparatus, image data generated by scanning in the image reading apparatus, and executes the image processing instructed by the job on the image data, using the specific image process function of the image processing apparatus.

4. The image processing apparatus according to claim 3, wherein the job specifies sending processing, which sends the image data read by the image reading apparatus.

5. A control method of an image processing apparatus for communicating with an image reading apparatus, each having a specific image process function, the control method comprising steps of:

storing first version information indicating a version of the specific image process function of the image reading apparatus and second version information indicating a version of the specific image process function of the image processing apparatus;

accepting a job to instruct image processing;

comparing, in a case where the job is accepted, the stored first version information and the stored second version information;

selecting an apparatus, on which the image processing is to be executed, from the image reading apparatus and the image processing apparatus, based on a result of the comparison, wherein the apparatus selected in the selecting step has a higher capability of executing the image processing instructed by the job, which is indicated by version information, than a capability of another apparatus that is not selected in the selecting step in executing the image processing instructed by the job; and controlling the image reading apparatus or the image processing apparatus, which is selected, to execute the image processing instructed by the job, wherein, in a case where the image processing apparatus is controlled to execute the image processing instructed by the job, the image processing apparatus receives, from the image reading apparatus, image data generated by scanning in the image reading apparatus, and executes the image processing instructed by the job on the image data, using the specific image process function of the image processing apparatus.

* * * * *